United States Patent [19]

Lin

[11] Patent Number: 4,912,923

[45] Date of Patent: Apr. 3, 1990

[54] DOUBLE-ROTOR ROTARY ENGINE AND TURBINE

[76] Inventor: Abraham S. Lin, 11637 Grand NE., Albuquerque, N. Mex. 87123

[21] Appl. No.: 273,147

[22] Filed: Nov. 17, 1988

Related U.S. Application Data

[63] Continuation of Ser. No. 24,451, Feb. 24, 1987, abandoned.

[51] Int. Cl.[4] .................................................. F02C 5/08

[52] U.S. Cl. ...................................... 60/39.34; 60/624; 123/44 C

[58] Field of Search .............................. 60/39.34, 624; 123/43 R, 44 R, 1 C, 1 D

[56] References Cited

U.S. PATENT DOCUMENTS

| | | | |
|---|---|---|---|
| 976,808 | 11/1910 | Kane | 123/44 R |
| 1,043,589 | 11/1912 | Haubner | 123/44 R |
| 1,263,736 | 4/1918 | Bower | 60/624 |
| 1,408,753 | 3/1922 | Long | 60/39.34 |
| 1,508,441 | 9/1924 | Brown | 60/39.34 |
| 2,103,787 | 12/1937 | McCrary | 123/44 C |
| 2,665,668 | 1/1954 | Ward | 60/624 X |
| 4,078,529 | 3/1978 | Warwick | 123/44 C |
| 4,307,695 | 12/1981 | Vasilantone | 60/624 X |

FOREIGN PATENT DOCUMENTS

| | | | |
|---|---|---|---|
| 19254 | 8/1914 | France | 60/624 |

OTHER PUBLICATIONS

"Physics", Halliday and Resnick, John Wiley and Sons, Inc., 1966, pp. 193, 194 and 305.

*Primary Examiner*—Michael Koczo

[57] ABSTRACT

This invention makes use of the combined advantages of the internal combustion engine and the turbine. A rotary internal combustion engine has a base and a housing rotatably mounted to the base and forming a radial cylinder. An output shaft is rotatably mounted concentric with the housing and has an arm rigidly extending therefrom. A piston slides in the cylinder for forming a combustion chamber, the piston being operatively connected to the arm. Relative rotational movement between the housing and the output shaft causes the piston to reciprocate in the cylinder. Rotation of the housing is caused by expension of exhaust gases from the cylinder passing through a turbine which is fixedly connected to the housing. Stop means are arranged on the shaft for limiting the relative movement between the shaft and the housing. Brake means are arranged on the base and the housing for facilitating a starting and a stopping sequences of the engine.

9 Claims, 3 Drawing Sheets

DOUBLE-ROTOR ROTARY ENGINE AND TURBINE

This application is a continuation of application Ser. No. 024,451, filed 2/24/87 now abandoned.

SUMMARY

The invented engine makes use of the combined advantages of the internal combustion engine and the turbine. The two rotors of the engine rotate with respect to each other, one having cylinders in it, and the other transmitting the power. The exhaust gas is utilized to produce an impulse at the base of the engine based upon the principle of the turbine, and then the reaction from the base exerts a tangential force on the rotor system. The relative motion of two rotors can reduce the lost motion of the smaller rotor through which meaningful work is not being done. Because of the structure of engine, the loss of efficiency due to reciprocation can be in large measure reduced so that the mechanical efficiency of the engine is increased. Another feature of the engine is that the larger rotor with cylinders has the same function as a flywheel so that no flywheel is needed in the engine.

DRAWINGS

Figure 4:
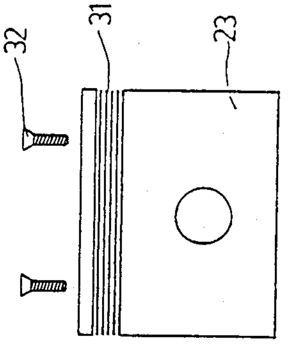
Figure 1:
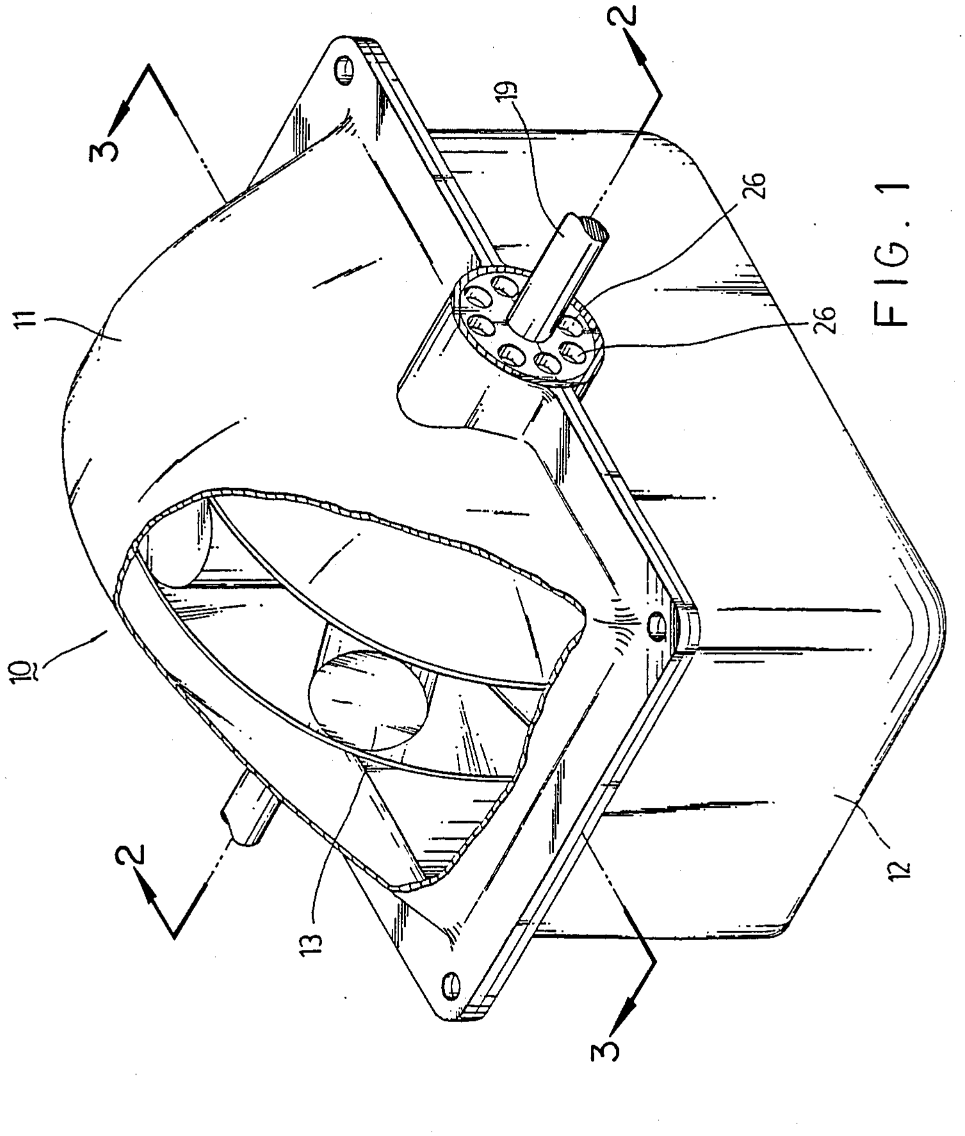
Figure 5:
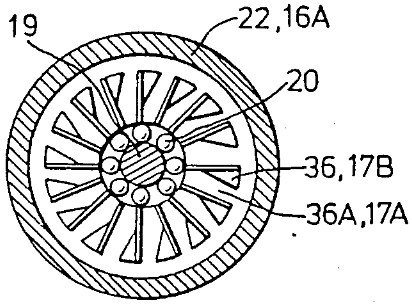
Figure 2:
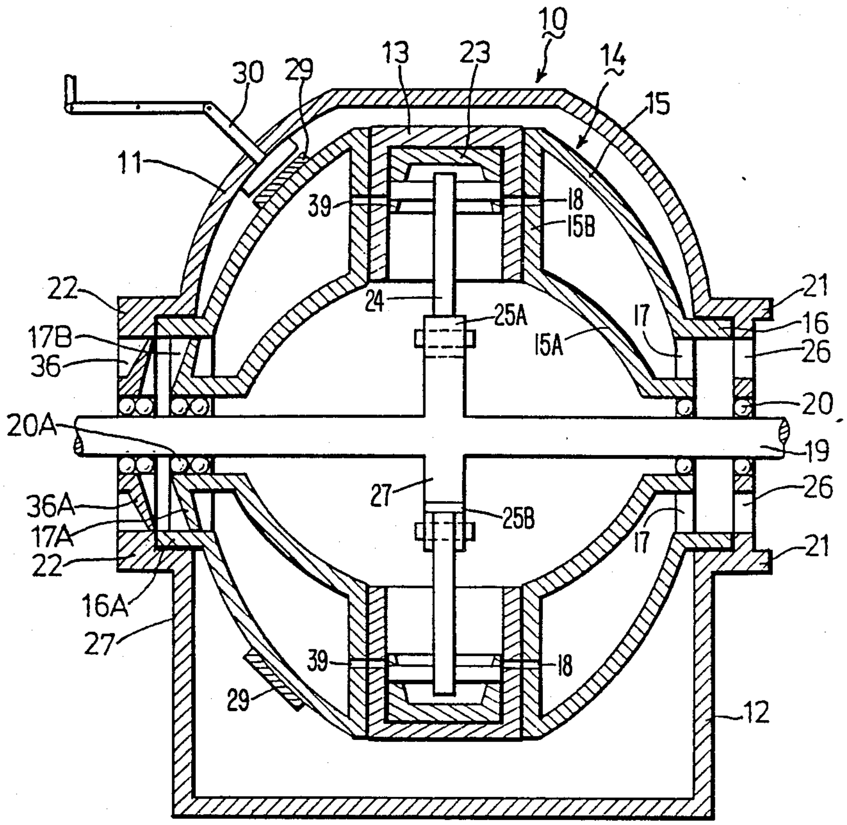
Figure 3:
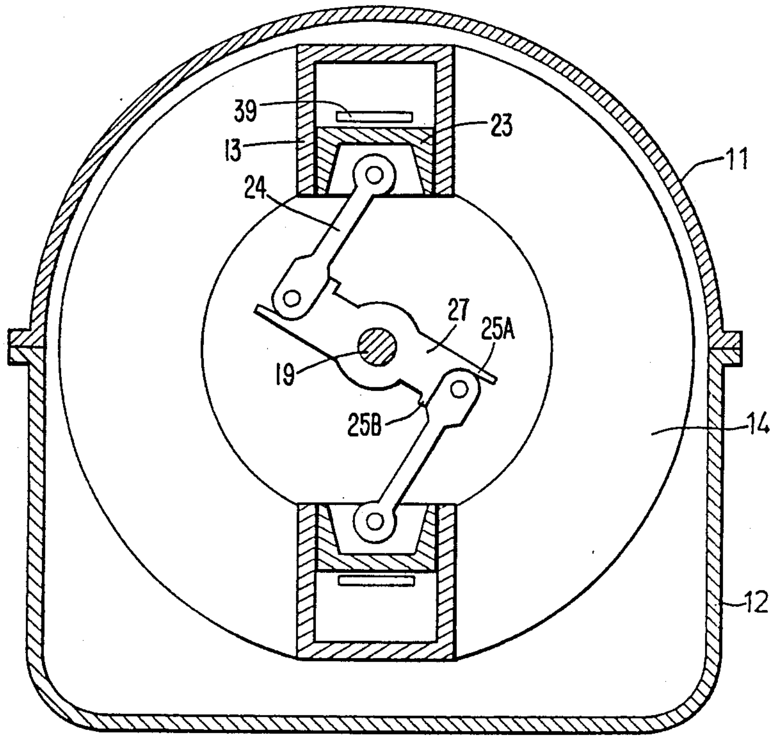

The structure of the invented engine is described in the following figures:

FIG. 1, a perspective view of the whole engine;

FIG. 2, a vertical sectional view of the engine along 2—2 in FIG. 1;

FIG. 3, a vertical sectional view of the engine along 3—3 in FIG. 1;

FIG. 4, a side view of the piston used in the engine;

FIG. 5, a vertical sectional view of the opening of turbine.

FIG. 1 shows the exterior of the double-rotor rotary engine 10 which has a rotating part and a base. The rotating part consists of a larger rotor 14 and a smaller rotor 19. Larger one may be called the rotatable cylinder housing and the smaller one means the transmitting shaft. The base consists of the cover 11 and the sump 12. Cover 11 is partially cut in order to show cylinder 13. All of the cylinders 13 are fixed within the rotor 14.

From FIG. 2, it can be seen that rotor 14 has two hollow cases, one of which is indicated by shell plates 15, 15A and 15B. Cylinder 13 is installed between these two hollow cases and rotates together with them. Each cylinder 13 has an inlet 18 which communicates with openings 17 and 26, and an outlet 39 which communicates with openings 17B and 36. Openings 17B and 36, formed by the blades 17A and 36A, take the role of the exhaust turbine. The mixture of fuel and air enters cylinder 13 from the openings 17, 26 and the inlet 18, and exhausts from cylinder 13 by outlet 39 and the openings 17B, 36. Rotor 19 has two arms 27 and is supported by bearing 20 on the base. Rotor 14 is supported by bearing 20A on rotor 19. Piston 23 moves relatively to cylinder 13 and is connected to the rotor 19 by connecting rod 24 and arm 27.

FIG. 3 shows that the stoppers 25A and 25B limit the relative rotation of the two rotor 19, 14 and the motion of piston 23. Hence, the two positions of the piston 23 can be adjusted, i.e., piston 23 being at the top dead point and being at the bottom dead point.

FIG. 4 shows a detailed drawing of piston 23. A number of gaskets 31 are attached to piston 23 by the bolts 32. By changing the number of gaskets, the compression ratio can be adjusted for different fuels.

FIG. 5 shows a structure of openings 17B and 36 which works for the exhaust turbine.

Lubricating oil is contained in sump 12 as shown in FIGS. 2 and 3. The oil is stirred by rotor 14 for lubrication of the engine.

FIG. 2 also shows that on the outer surface of shell plate 15 there is a brake device 29 and 30 for facilitating starting and stopping the engine.

As can be seen from the figures, rotor 14 and rotor 19 rotate relative to each other and also relative to the base of engine. The relative angular motion between these two rotors can be held by stoppers 25A and 25B to less than 90°. This means that when piston 23 moves between the top dead point and the bottom dead point in cylinder 13, the angular motion of rod 24 and arm 27 changes relative to each other less than 90°. Because of this feature, and the effect of the turbine, the invented engine increases efficiency which is not high in conventional reciprocating engines because of the 360° rotation of the piston rod around the crank arm.

PROCESS OF OPERATION

A. Starting Procedure:

When the engine is stopped, rotor 14 is braked by brake devices 29 and 30. When rotor 19 starts, piston 23 will move towards the bottom dead point and will open inlet 18 so that the mixture of fuel and air flows into cylinder 13. When piston 23 reaches the bottom dead point in the cylinder 13, the brake on rotor 14 is withdrawn.

B. Compression Stroke:

Because of the centrifugal force, piston 23 will move from the bottom dead point towards the top dead point, and the compression stroke will start while the initial torque continues. At the same time, rotor 14 begins to move because piston 23 is positioned in cylinder 13 which is fixed within the rotor 14. As the movement of the engine continues, rotor 14 will achieve more momentum than rotor 19 and will advance so that piston 23, with its own centrifugal force, will move easily from the bottom dead point towards the top dead point. When the movement of piston 23 closes inlet 18 and outlet 39 in the cylinder 13, the mixture of fuel and air is compressed. Hence, the compression stroke is completed as piston 23 reaches the top dead point.

C. Explosion Stroke:

By the predetermined compression ratio which makes the mixture of fuel and air explode, the explosion stroke starts while piston 23 reaches the top dead point in cylinder 13. When the explosion of mixture occurs and the initial torque has been withdrawn, piston 23 will move from the top dead point towards the bottom dead point. But, before the exhaust process occurs, rotor 19, pushed by the piston 23, cannot generate effectively output power. Because no tangential force occurs between the rotating part and the base of engine so that the rotating part is only freely rotating. So at this point, Newton's Third Law has not been satisfied. The engine will stop while the inertia momentum of the rotating part, imported by the initial torque, decays. As the movement of piston 23 opens outlet 39, and the exhaust process starts, opening 36 on the base of engine will react on the rotor 14 because of the effect of the turbine function between the blades 17A and 36A. The exhaust pressure passing through blade 36A of opening 36 will react on the blade 17A of opening 17B which is fixed on the rotor 14. Therefore, the conservation of momentum does not hold since the tangential force acting on the rotor 14 is not equal to zero, i.e., Newton's Third Law has been satisfied for the first time. This reaction produces the tangential force on rotor 14 so that rotor 14, in turn, takes the role of base to react on the rotor 19. So, Newton's Third Law has been satisfied for the second time. Rotor 19, through piston 23, will be pushed by the expanding pressure for output power while rotor 14 receives the tangential force. The completion of each explosion stroke requires satisfaction of Newton's Third Law two times so that the engine cannot operate without either one of these two satisfactions. Rotor 19 begins to produce output power while piston 23 moves from outlet 39 and ends while piston 23 reaches the bottom dead point. The output power of the engine will not be lost by the shortened output stroke because the momentum of rotor 14, produced by tangential force, is included in the output work because of the free rotation of rotating part with respect to the base of engine. The speed of the engine is responsive to the torque reaction between rotor 14 and the base of the engine as produced by an exhaust turbine, and between the larger rotor 14 and the smaller rotor 19 as produced by an expansion of combustion products in cylinder 13. There are no gears utilized between the rotating part and the base of the engine so the rotating part has the same function as a flywheel, i.e., to rotate smoothly. When the explosion stroke is finished, piston 23 has reached the bottom dead point and has opened inlet 18. Piston 23, with its own centrifugal force and by the greater momentum of rotor 14, will move again from the bottom dead point towards the top dead point. Therefore, the next compression stroke will proceed. When the engine needs to stop, the brake devices 29 and 30 can be utilized to help because the freely rotatable rotating part of the engine has produced a large inertia momentum.

CONCLUSION

This invention is directed to a compound rotor engine which includes means for admitting a fuel-air mixture, means for compressing and igniting the mixture, means for expanding combustion products in the cylinder 13, means for releasing combustion products from the cylinder 13, and an exhaust gas turbine between the larger rotor 14 and the base of engine. These means are reconstructed as described in the PROCESS OF OPERATION. The means for compressing the mixture operate during a first direction of relative rotation, and the means for expanding combustion products operate during an opposite direction of relative rotation. It is also the case that the larger rotor 14 can form an unlimited number of cylinders 13, each having a rod-connected piston 23 to the smaller rotor 19. Only this invention discovered the less than 90° rotation of the piston rod 24 around the arm 27 and the freely rotatable rotor-system in which no gears have been utilized. So, preferably, the pistons 23 move symmetrically in unison, the compressing means and the expanding means each operating simultaneously without obstructing the rotational balance while varying a reciprocating movement of inertia of the piston 23.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A double-rotor rotary engine comprising:

(a) a base;

(b) a housing rotatably mounted to the base and forming a radial cylinder;

(c) an output shaft rotatably mounted concentric with the housing and having an arm rigidly extending therefrom within the housing;

(d) a piston slidingly engaging the cylinder and forming a combustion chamber with the cylinder, the piston being operatively connected to the arm for movement within the cylinder in response to relative rotational movement between the housing and the output shaft;

(e) means for admitting a fuel-air mixture into the cylinder;

(f) means for releasing combustion products from the cylinder following operation of the expanding means;

(g) turbine means operatively connected between the base and the housing, the turbine means providing a torque reaction against the housing in response to flow of the combustion products from the releasing means; and (h) stop means on the shaft for limiting the relative movement between the shaft and the housing, between a first position wherein the piston is radially extended within the cylinder and a second position wherein the piston is retracted toward the shaft.

2. The double-rotor rotary engine of claim 1 wherein the base is stationary.

3. The double-rotor rotary engine of claim 1 wherein the housing forms a plurality of spaced cylinders, each cylinder having a corresponding shaft-connected piston.

4. A double-rotor rotary engine of claim 3 wherein the pistons move symmetrically in unison within the respective cylinders in response to the relative rotational movement of the output shaft.

5. The double-rotor rotary engine of claim 1 wherein the connection of the piston to the arm is by a connecting rod, the rod being pivotally connected at opposite ends thereof to the piston and the arm, respectively.

6. The double-rotor rotary engine of claim 1 wherein the turbine means comprises a rotor fixed relative to the housing and a stator fixed relative to the base.

7. The double-rotor rotary engine of claim 1 wherein the first position of the shaft locates the piston proximately at the top dead center relative to the cylinder.

8. The double-rotor rotary engine of claim 1 wherein the relative movement is less than about 90 degrees.

9. The double-rotor rotary engine of claim 1 further comprising brake means for holding the housing fixed relative to the base for facilitating a starting sequence of the engine.

* * * * *